United States Patent
Morita et al.

(10) Patent No.: US 10,047,239 B2
(45) Date of Patent: *Aug. 14, 2018

(54) ORGANIC SOLVENT DISPERSION OF TITANIUM OXIDE PARTICLES AND METHOD FOR PRODUCING SAME

(71) Applicant: SAKAI CHEMICAL INDUSTRY CO., LTD., Osaka (JP)

(72) Inventors: Takanori Morita, Osaka (JP); Atsushi Miyata, Osaka (JP); Kasumi Onishi, Osaka (JP)

(73) Assignee: SAKAI CHEMICAL INDUSTRY CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/552,532

(22) PCT Filed: Feb. 23, 2016

(86) PCT No.: PCT/JP2016/055310
§ 371 (c)(1),
(2) Date: Aug. 22, 2017

(87) PCT Pub. No.: WO2016/136763
PCT Pub. Date: Sep. 1, 2016

(65) Prior Publication Data
US 2018/0030305 A1   Feb. 1, 2018

(30) Foreign Application Priority Data
Feb. 27, 2015  (JP) ................. 2015-038959

(51) Int. Cl.
C09C 1/36   (2006.01)
C09D 17/00  (2006.01)

(52) U.S. Cl.
CPC .......... C09D 17/008 (2013.01); C09C 1/3684 (2013.01); *C01P 2006/22* (2013.01)

(58) Field of Classification Search
CPC .. C09D 17/008; C09C 1/3684; C01P 2006/22
See application file for complete search history.

(56) References Cited

U.S. PATENT DOCUMENTS

| 2012/0003287 A1 | 1/2012 | Schlossman et al. |
| 2012/0217456 A1 | 8/2012 | Nagakawa et al. |
| 2018/0029897 A1* | 2/2018 | Morita ................ C01G 23/047 |

FOREIGN PATENT DOCUMENTS

| JP | 2001181136 A | * | 7/2001 |
| JP | 2005-307158 | | 11/2005 |
| JP | 2009-35573 | | 2/2009 |
| JP | 2009-73685 | | 4/2009 |
| JP | 2012-521442 | | 9/2012 |
| WO | 2008/010533 | | 1/2008 |
| WO | 2011/052762 | | 5/2011 |
| WO | 2016/035689 | | 3/2016 |

OTHER PUBLICATIONS

International Search Report dated May 17, 2016 in corresponding International (PCT) Application No. PCT/JP2016/055310.

* cited by examiner

*Primary Examiner* — Anthony J Green
(74) *Attorney, Agent, or Firm* — Wenderoth, Lind & Ponack, L.L.P.

(57) ABSTRACT

The invention provides an organic solvent dispersion of titanium oxide particles in a content of 10% by weight or more in an organic solvent except methanol and ethanol, wherein the titanium oxide particles are surface-treated with a surface treating agent comprising a silane coupling agent having the general formula (I)

$$(RO)_n\text{—Si—}X_{4-n} \quad (I)$$

wherein R is an alkyl group having carbon atoms of 1-4, n is 2 or 3, X is an alkyl, a fluoroalkyl, a vinyl or a (meth)acryloyloxyalkyl group, and 12-hydroxystearic acid, and wherein the titanium oxide particles in the organic solvent have a D50 in a range of 1 to 30 nm, and wherein the organic solvent dispersion has a transmittance of 2% or more at a wavelength of 500 nm and a transmittance of 70% or more at a wavelength of 800 nm, a viscosity of 10 mPa·s or less at a temperature of 25° C. immediately after production while the increase in the viscosity is 40 mPa·s or less seven days after production as compared to that of the dispersion immediately after production.

4 Claims, No Drawings

ORGANIC SOLVENT DISPERSION OF TITANIUM OXIDE PARTICLES AND METHOD FOR PRODUCING SAME

TECHNICAL FIELD

The invention relates to a dispersion of titanium oxide particles in an organic solvent, i.e., an organic dispersion of titanium oxide particles, and a method for producing the same. The invention relates more particularly to an organic solvent dispersion of titanium oxide particles which contains titanium oxide particles in a high content, has a low viscosity, and is also superior in stability and transparency, and a method for producing the same. Because the organic solvent dispersion of titanium oxide particles according to the invention has such properties mentioned above, it is useful in various applications in the field of optics, especially as a material for an optical composite resin such as an LED sealing resin or an anti-reflection coating.

BACKGROUND OF THE INVENTION

Dispersions of particles of an inorganic oxide such as silica, alumina, zinc oxide, tin oxide, zirconia, and titania are employed in various industrial fields, particularly in the field of optics for modulating refractive index. Among those inorganic oxides particles, titania particles are employed preferably for increasing the refractive index of an optical material because they have a high refractive index.

As such a dispersion of inorganic oxide particles, an aqueous dispersion whose dispersion medium is water has been conventionally used. However, most of the optical material applications such as optical film production utilize such an aqueous dispersion usually as being mixed with resin components, and such an aqueous dispersion is kneaded only with difficulty in particular with a water-insoluble resin component. Accordingly, an organic dispersion whose dispersion medium is an organic solvent is becoming highly demanded in these days.

The inorganic oxide particles including titanium oxide particles are generally dispersible satisfactorily in aqueous solvents, but are poorly dispersible generally in organic solvents.

Such being the case, in the production of organic solvent dispersion of inorganic oxide particles, it is already known that surface treating the inorganic oxide particles with a silane coupling agent is effective in order to modify the inorganic oxide fine particles to be lipophilic (See, for example, Patent Literatures 1 and 2).

Also in the production of an organic solvent dispersion of titanium oxide, a method using a silane coupling agent has been proposed as described above. For example, there has been proposed a method in which a silane coupling agent is mixed with an alcohol dispersion of titanium oxide fine particles in the presence of acetic acid and the resulting mixture is stirred to surface-treat the titanium oxide fine particles, and then the dispersion medium of the alcohol dispersion of the titanium oxide fine particles is replaced by a lipophilic organic solvent such as methyl ethyl ketone, thereby obtaining a lipophilic organic solvent dispersion of titanium oxide fine particles (see Patent Literature 3).

However, the above-mentioned conventionally known methods are not successful in providing an organic solvent dispersion having a sufficient transparency depending on applications. In addition, the organic solvent dispersion obtained suffers poor stability such as gradual increase in viscosity. Such being the case, a higher performance of an optical material is becoming highly demanded in these days, and an organic solvent dispersion of titanium oxide particles which has a low viscosity and is superior in stability and transparency is highly demanded.

PRIOR ART DOCUMENTS

Patent Literatures

Patent Literature 1: JP 2005-307158 A
Patent Literature 2: JP 2009-35573 A
Patent Literature 3: International Publication WO2011/052762

SUMMARY OF THE INVENTION

Problems to be Solved by the Invention

The invention has been completed to solve the above-mentioned problems involved in an organic solvent dispersion of titanium oxide particles. Therefore, it is an object of the invention to provide an organic solvent dispersion of titanium oxide particles which contains titanium oxide particles in a high content, has a low viscosity, and is also superior in stability and transparency, as well as a method for producing the same.

Means to Solve the Problems

The invention provides an organic solvent dispersion of titanium oxide particles in a content of 10% by weight or more in an organic solvent except methanol and ethanol, wherein the titanium oxide particles are surface-treated with a surface treating agent comprising a silane coupling agent having the general formula (I)

$$(RO)_n\text{—Si—}X_{4-n} \qquad (I)$$

wherein R is an alkyl group having carbon atoms of 1-4, n is 2 or 3, X is an alkyl, a fluoroalkyl, a vinyl or a (meth) acryloyloxyalkyl group, and 12-hydroxystearic acid, and wherein the titanium oxide particles in the organic solvent have a D50 in a range of 1 to 30 nm, and wherein the organic solvent dispersion has a transmittance of 2% or more at a wavelength of 500 nm and a transmittance of 70% or more at a wavelength of 800 nm, a viscosity of 10 mPa·s or less at a temperature of 25° C. immediately after production while the increase in the viscosity is 40 mPa·s or less seven days after production as compared to that of the dispersion immediately after production.

The invention further provides a method for producing the above-mentioned organic solvent dispersion of titanium oxide particles.

Thus, the invention provides a method for producing an organic solvent dispersion of titanium oxide particles in a content of 10% by weight or more in an organic solvent except methanol and ethanol, wherein the titanium oxide particles in the organic solvent have a D50 in a range of 1 to 30 nm, and wherein the organic solvent dispersion has a transmittance of 2% or more at a wavelength of 500 nm and a transmittance of 70% or more at a wavelength of 800 nm, a viscosity of 10 mPa·s or less at a temperature of 25° C. immediately after production while the increase in the viscosity is 40 mPa·s or less seven days after production as compared to that of the dispersion immediately after production.

the method comprising:

a surface treating process for surface treating an alcohol dispersion of titanium oxide particles in at least one alcohol solvent selected from the group consisting of methanol and ethanol with a surface treating agent comprising a silane coupling agent and 12-hydroxystearic acid thereby surface treating the titanium oxide particles; and a solvent replacing process for replacing the alcohol solvent that is a dispersion medium of the alcohol dispersion of titanium oxide particles by the organic solvent except methanol and ethanol, wherein the silane coupling agent has the general formula (I)

$$(RO)_n\text{—Si—}X_{4-n} \qquad (I)$$

wherein R is an alkyl group having carbon atoms of 1-4, n is 2 or 3, X is an alkyl, a fluoroalkyl, a vinyl or a (meth) acryloyloxyalkyl group.

According to the invention, among the processes constituting the method for producing the organic solvent dispersion of titanium oxide particles as described above, the alcohol dispersion of titanium oxide particles used in the surface treating process is preferably obtained by the following steps (a) to (c):

(a) a step of wet dispersing treatment of an aqueous slurry of titanium oxide particles in the presence of acetic acid and nitric acid with a medium agitating mill or a high pressure dispersing machine to obtain an aqueous dispersion of titanium oxide particles;

(b) a step of washing the aqueous dispersion of titanium oxide particles obtained in the step (a); and (c) a step of replacing the water that is the dispersion medium of the aqueous dispersion of titanium oxide particle obtained in the step (b) by at least one alcohol solvent selected from methanol and ethanol.

Effect of the Invention

According to the invention, there are performed the surface treating process for surface treating an alcohol dispersion of titanium oxide particles in an at least one alcohol selected from the group consisting of methanol and ethanol with the aforementioned surface treating agent comprising the silane coupling agent and 12-hydroxystearic acid thereby surface treating the titanium oxide particles followed by the solvent replacing process for replacing the alcohol solvent as the dispersion medium of the alcohol dispersion by an organic solvent other than the aforementioned alcohol, and as a consequence, there is readily and stably obtained an organic solvent dispersion of titanium oxide particles which contains titanium oxide particles in a high content, has a low viscosity, does not undergo gradual increase in viscosity, precipitation of particles or reduction in transparency, and is superior in stability and transparency.

The organic solvent dispersion of titanium oxide particles according to the invention contains the titanium oxide particles in a high content as described above, while it has a low viscosity and is superior in stability and transparency, and in addition, they do not suffer deterioration in the desirable properties that the titanium oxide particles inherently possess, such as a high refractive index. Accordingly, the organic solvent dispersion of titanium oxide particles of the invention is preferably used in various applications in the field of optics, particularly as a material for an optical composite resin such as an LED sealing resin or an anti-reflection coating.

EMBODIMENTS OF THE INVENTION

The organic solvent dispersion of titanium oxide particles according to the invention is an organic solvent dispersion of titanium oxide particles in a content of 10% by weight or more in an organic solvent except methanol and ethanol, wherein the titanium oxide particles are surface-treated with a surface treating agent comprising a silane coupling agent having the general formula (I)

$$(RO)_n\text{—Si—}X_{4-n} \qquad (I)$$

wherein R is an alkyl group having carbon atoms of 1-4, n is 2 or 3, X is an alkyl, a fluoroalkyl, a vinyl or a (meth) acryloyloxyalkyl group, and 12-hydroxystearic acid, and wherein the titanium oxide particles in the organic solvent have a D50 in a range of 1 to 30 nm, and wherein the organic solvent dispersion has a transmittance of 2% or more at a wavelength of 500 nm and a transmittance of 70% or more at a wavelength of 800 nm, and a viscosity of 10 mPa·s or less at a temperature of 25° C. immediately after production while the increase in the viscosity is 40 mPa·s or less seven days after production as compared to that of the dispersion immediately after production.

In the organic solvent dispersion of titanium oxide particles according to the invention, the titanium oxide particles may be crystalline or amorphous. When they are crystalline, they may be rutile, anatase, brookite, or a mixture of these, or may be a mixture of crystalline and amorphous.

First, the method for producing the organic solvent dispersion of titanium oxide particles according to the invention is described.

The method for producing the organic solvent dispersion of titanium oxide particles according to the invention is a method for producing an organic solvent dispersion of titanium oxide particles in a content of 10% by weight or more in an organic solvent except methanol and ethanol, wherein the titanium oxide particles in the organic solvent have a D50 in a range of 1 to 30 nm, and wherein the organic solvent dispersion has a transmittance of 2% or more at a wavelength of 500 nm and a transmittance of 70% or more at a wavelength of 800 nm, a viscosity of 10 mPa·s or less at a temperature of 25° C. immediately after production while the increase in the viscosity is 40 mPa·s or less seven days after production as compared to that of the dispersion immediately after production.

the method comprising:

a surface treating process for surface treating an alcohol dispersion of titanium oxide particles in at least one alcohol solvent selected from the group consisting of methanol and ethanol with a surface treating agent comprising a silane coupling agent and 12-hydroxystearic acid thereby surface treating the titanium oxide particles; and a solvent replacing process for replacing the alcohol solvent that is the dispersion medium of the alcohol dispersion of titanium oxide particles by the organic solvent except methanol and ethanol, wherein the silane coupling agent has the general formula (I)

$$(RO)_n\text{—Si—}X_{4-n} \qquad (I)$$

wherein R is an alkyl group having carbon atoms of 1-4, n is 2 or 3, X is an alkyl, a fluoroalkyl, a vinyl or a (meth) acryloyloxyalkyl group.

The alcohol solvent as the dispersion medium of the alcohol dispersion of titanium oxide particles is at least one selected from the group consisting of methanol and ethanol as described above, and methanol is employed preferably.

According to the invention, the D50 of the titanium oxide particles in the alcohol dispersion of titanium oxide particles is preferably in a range of 1 to 20 nm, more preferably in a range of 2 to 10 nm, so that the resultant organic solvent dispersion is superior in transparency. The D90 is preferably 40 nm or less. Furthermore, the alcohol dispersion of titanium oxide particles preferably has a transmittance of 40% or more at a wavelength of 500 nm and a transmittance of 80% or more at a wavelength of 800 nm when it contains titanium oxide particles in an amount of 10% by weight or more.

In the invention, the D50 of titanium oxide particles refers to the particle diameter when the volume base cumulative size distribution based on the particle size distribution of the titanium oxide particles of the dispersion measured by the dynamic light scattering method is 50% (that is, an average particle diameter or a median diameter). Similarly, the D90 and D100 refer to the particle diameter when the volume base cumulative size distribution is 90% and 100%, respectively.

Also in the invention, when the alcohol dispersion of titanium oxide particles is surface-treated, it has preferably a content of titanium oxide particles in a range of 1 to 40% by weight, preferably in a range of 5 to 30% by weight so that the titanium oxide particles are effectively surface-treated with the surface-treating agent comprising the silane coupling agent and 12-hydroxystearic acid.

The method for producing the organic solvent dispersion of titanium oxide particles according to the invention comprises, as described hereinabove, a surface treating process for surface treating an alcohol dispersion of titanium oxide particles in at least one alcohol solvent selected from the group consisting of methanol and ethanol with a surface treating agent comprising a silane coupling agent having the general formula (I)

wherein R is an alkyl group having carbon atoms of 1-4, n is 2 or 3, X is an alkyl, a fluoroalkyl, a vinyl or a (meth) acryloyloxyalkyl group, and 12-hydroxystearic acid thereby surface treating the titanium oxide particles; and a solvent replacing process for replacing the alcohol solvent that is a dispersion medium of the alcohol dispersion of titanium oxide particles by the aforementioned organic solvent except methanol and ethanol.

In the silane coupling agent represented by the formula (I) shown above, the alkyl group R having 1 to 4 carbon atoms denotes a methyl group, an ethyl group, a propyl group or a butyl group, and the alkyl group having 3 or 4 carbon atoms may have a form of a straight or branched chain.

In the general formula (I) shown above, when X is an alkyl group, it has usually 1 to 20 carbon atoms, preferably 1 to 12 carbon atoms. Thus, examples of such an alkyl group include a methyl group, an ethyl group, a propyl group, a hexyl group, a decyl group, and an undecyl group. The alkyl group having 3 or more carbon atoms may have a form of a straight chain or a branched chain.

Accordingly, the silane coupling agent wherein X is an alkyl group in the general formula (I) shown above includes, for example, methyltrimethoxy-silane, methyltriethoxysilane, isobutyltrimethoxysilane, butyl-trimethoxysilane, hexyltrimethoxysilane, decyltrimethoxysilane, butyltriethoxysilane, isobutyltriethoxysilane, hexyltriethoxysilane, octyltriethoxysilane, decyltriethoxysilane, undecyltriethoxysilane, dimethyldimethoxysilane, diethyldimethoxysilane, diethyldiethoxysilane, and the like.

In the general formula (I) shown above, when X is a fluorinated alkyl group, it usually has 1 to 18 carbon atoms, preferably 1 to 10 carbon atoms. Accordingly, as examples of such a fluorinated alkyl group are mentioned trifluoromethyl, trifluoroethyl, trifluoropropyl, perfluorooctylethyl group, and the like.

Accordingly, the silane coupling agent wherein X is a fluorinated alkyl group in the formula (I) includes, for example, 3,3,3-trifluoro-propyltrimethoxysilane, perfluorooctylethyltrimethoxysilane, perfluorooctylethyltriethoxysilane, perfluorooctylethyltriisopropoxy-silane, and the like.

In the silane coupling agent represented by the general formula (I) shown above, when X is a vinyl group, examples of such a silane coupling agent include vinyltrimethoxysilane, vinyltriethoxysilane and the like.

The silane coupling agent represented by the general formula (I) shown above wherein X is a (meth)acryloyloxyalkyl group includes, for example, (meth)acryloyloxymethyltrimethoxysilane, (meth)acryloyloxymethyl-triethoxysilane, 2-(meth)acryloyloxyethyltrimethoxysilane, 2-(meth) acryloyloxyethyltriethoxysilane, 3-(meth) acryloyloxypropyltrimethoxysilane, 3-(meth) acryloyloxypropyltriethoxysilane, 3-methacryloyloxypropylmethyldimethoxysilane and the like. The (meth)acryloyl means an acryloyl or a methacryloyl.

The silane coupling agent and 12-hydroxystearic acid, each a component constituting the surface treating agent according to the invention, may be added simultaneously to the alcohol dispersion of titanium oxide particles, or alternatively, any one of the two may be added first and thereafter the other may be added.

When surface treating the alcohol dispersion of titanium oxide particles, any one or the both of the components of the surface treating agent may be dissolved in an appropriate organic solvent such as the same alcohol solvent as the dispersion medium of the alcohol dispersion of titanium oxide particles (for convenience, hereinafter sometimes referred to also as an alcohol solvent A), or the same organic solvent as the dispersion medium of the intended organic solvent dispersion of titanium oxide particles (for convenience, hereinafter sometimes referred to also as an organic solvent S), and the resulting solution may be added to the alcohol dispersion. Alternatively, the surface treating agent may be added to the alcohol dispersion of titanium oxide particles, and then the organic solvent S may be added to the resulting dispersion.

More specifically, for example, any one of the following processes may be employed in order to surface treating the titanium oxide particles with the surface treating agent comprising the silane coupling agent and 12-hydroxystearic acid.

(Surface Treating Process 1)

The silane coupling agent and 12-hydroxystearic acid are added as they are to the alcohol dispersion of titanium oxide particles at an ambient temperature, or to the alcohol dispersion heated if necessary to a temperature lower than the boiling point of the dispersion medium thereof, and the resultant is mixed and stirred to surface-treat the titanium oxide particles with the surface treating agent.

(Surface Treating Process 2)

The silane coupling agent and 12-hydroxystearic acid are dissolved in an appropriate organic solvent, for example, an alcohol solvent A, and the resulting alcohol solution is added under an atmospheric pressure to the alcohol dispersion of titanium oxide particles at an ambient temperature, or to the alcohol dispersion heated if necessary to a temperature lower than the boiling point of the dispersion medium thereof, and the resultant is mixed and stirred to treat the alcohol dispersion of titanium oxide particles thereby surface treating the titanium oxide particles with the surface treatment agents.

(Surface Treating Process 3)

The silane coupling agent and 12-hydroxystearic acid are dissolved in an appropriate organic solvent, preferably an organic solvent S, and the resulting solution is added under an atmospheric pressure to the alcohol dispersion of titanium oxide particles at an ambient temperature, or to the alcohol dispersion heated if necessary to a temperature lower than the boiling point of the dispersion medium thereof, and the resultant is mixed and stirred to treat the alcohol dispersion of titanium oxide particles in the presence of the organic solvent thereby surface treating the titanium oxide particles with the surface treating agent.

(Surface Treatment Process 4)

As described in the surface treating process 1 to 3, the silane coupling agent and 12-hydroxystearic acid are added to the alcohol dispersion of titanium oxide particles, and then an organic solvent S is added, and mixed and stirred to treat the alcohol dispersion of titanium oxide particles in the presence of the organic solvent S thereby surface treating the titanium oxide particles with the surface treating agent.

Adding a solution of the surface treating agent dissolved in an organic solvent S or adding an organic solvent S to the alcohol dispersion of titanium oxide particles as in the above-mentioned surface treating process 3 and 4 means changing the dispersion medium of the dispersion of titanium oxide particles to a mixture of the alcohol and the organic solvent, and accordingly, it means treating the dispersion of titanium oxide particles whose dispersion medium is the mixture of the alcohol and the organic solvent S with the surface treating agent thereby surface treating the titanium oxide particles with the surface treating agent.

Thus, a process in which the alcohol dispersion of titanium oxide particles is treated with the surface treating agent in the presence of the organic solvent, i.e., a process in which the dispersion of titanium oxide particles of which dispersion medium is a mixture of the alcohol and the organic solvent S is treated with the surface treating agent is one of the surface treating processes preferably employed in the invention.

According to the invention, the surface treating agent is used so that it comprises 1 to 40 parts by weight of the silane coupling agent and 1 to 80 parts by weight of 12-hydroxystearic acid, each relative to 100 parts by weight of the titanium oxide particles in the alcohol dispersion of titanium oxide particles. In particular, according to the invention, the silane coupling agent is used preferably in an amount in a range of 1 to 10 parts by weight relative to 100 parts by weight of titanium oxide particles in the alcohol dispersion of titanium oxide particles. Similarly, 12-hydroxystearic acid is used preferably in an amount in a range of 1 to 10 parts by weight relative to 100 parts by weight of titanium oxide particles in the alcohol dispersion of titanium oxide particles.

It is preferred in the invention that the surface treating agent consists of the silane coupling agent and 12-hydroxystearic acid. In other words, it is preferred in the invention that the surface treating agent does not include any other surface treating agent than the silane coupling agent and 12-hydroxystearic acid.

Further according to the invention, the surface treating agent is preferably used so that the total amount of the silane coupling agent and 12-hydroxystearic acid is in a range of 2 to 20 parts by weight, preferably in a range of 5 to 20 parts by weight, relative to 100 parts by weight of the titanium oxide particles in the alcohol dispersion of titanium oxide particles.

According to the invention, the intended organic solvent dispersion of titanium oxide particles is obtained in this way by performing the surface treating process for surface treating the titanium oxide particles in the alcohol dispersion with the surface treating agent and the solvent replacing process for replacing the alcohol solvent as a dispersion medium of the alcohol dispersion of the thus surface-treated titanium oxide particles with the aforementioned organic solvent except methanol and ethanol.

According to the invention, the solvent replacing process may be performed after performing the surface treating process, or alternatively, the surface treating process may be performed while simultaneously performing the solvent replacing process.

As an example of the former process, as described hereinbefore, the silane coupling agent and 12-hydroxystearic acid are added to the alcohol dispersion of titanium oxide particles at an ambient temperature under atmospheric pressure, and the resultant is mixed and stirred to surface-treat the titanium oxide particles with the surface treating agent, and then the organic solvent is added to the resulting alcohol dispersion continuously or intermittently to replace the alcohol solvent as a dispersion medium of the alcohol dispersion by the organic solvent, thereby obtaining the intended organic solvent dispersion.

As a further method of the former process, for example, similarly to the aforementioned surface treating process 3 and 4, the silane coupling agent and 12-hydroxystearic acid are dissolved in an organic solvent S, and the resulting solution is added to the alcohol dispersion of titanium oxide particles, or the silane coupling agent and 12-hydroxystearic acid added to the alcohol dispersion of titanium oxide particles together with an organic solvent S, and then the resulting dispersion of titanium oxide particles is subjected in the presence of the organic solvent, i.e., the dispersion of titanium oxide particle of which dispersion medium is a mixture of the alcohol and the organic solvent S, to surface treatment of titanium oxide particles with the surface treating agent, followed by solvent replacement, i.e., removal of the alcohol from the resulting dispersion, thereby obtaining the intended organic solvent dispersion. This process is one of the processes preferably employed in the solvent replacing process in the invention.

As an example of the latter process, the silane coupling agent and 12-hydroxystearic acid are dissolved in an organic solvent S, and the resulting solution is added to the alcohol dispersion of titanium oxide particles, or the silane coupling agent and 12-hydroxystearic acid are added to the alcohol dispersion of titanium oxide particles together with an organic solvent S, and then the resulting dispersion of titanium oxide particles is subjected, in the presence of the organic solvent, i.e., the dispersion of titanium oxide particle of which dispersion medium is a mixture of the alcohol and the organic solvent S, to surface treating the titanium oxide particles with the surface treating agent, while removing the alcohol from the dispersion to effect solvent replacement thereby also obtaining the intended organic solvent dispersion.

According to the invention, the organic solvent as a dispersion medium of the organic solvent dispersion of titanium oxide particles is preferably an organic solvent which is more lipophilic than methanol and ethanol. Such a lipophilic organic solvent may, for example, be alcohols having 3 or more carbon atoms, glycols, ketones, ketone alcohols, esters, ethers, hydrocarbons, halogenated carbons, carboxylic acid amides, sulfoxides, and the like.

The alcohol having 3 or more carbon atoms includes propanols such as isopropanol and butanols such as 1-butanol; the glycols such as ethylene glycol and propylene glycol; the ketones such as methyl ethyl ketone (MEK), diethyl ketone, methyl isobutyl ketone (MIBK), methyl amylketone, and cyclohexanone; the ketone alcohols such as diacetone alcohol; the esters such as ethyl acetate, butyl acetate, propylene glycol monomethyl ether acetate, diethylene glycol monoethyl ether acetate, methyl acrylate and methyl methacrylate; the ethers such as dibutyl ether, propylene glycol monomethyl ether, and dioxane; the hydrocarbons such as n-hexane, cyclohexane, toluene, xylene, and solvent naphtha; the halogenated hydrocarbons such as carbon tetrachloride, dichloroethane, and chlorobenzene; the carboxylic acid amides such as dimethylformamide, N,N-dimethylacetoamide, N,N,2-trimethylpropionamide, and N-methylpyrrolidone; and the sulfoxide includes dimethylsulfoxide and diethylsulfoxide.

According to the invention, particularly preferred lipophilic organic solvents include at least one selected from methyl isobutyl ketone, methyl ethyl ketone, diacetone alcohol, butanol, propanol, propylene glycol monomethyl ether, toluene, dimethylsulfoxide, N,N-dimethylacetoamide, N,N,2-trimethylpropionamide, γ-butyrolactone, and butyl acetate.

In the invention, when the alcohol solvent as a dispersion medium of the alcohol dispersion of titanium oxide particles is to be replaced by the above-mentioned lipophilic organic solvent other than the alcohol solvent, a distillation replacing method or an ultrafiltration concentration replacing method, which methods are already well known per se, are employed.

The distillation replacing method is a method in which the alcohol dispersion of titanium oxide particles surface-treated with the surface treating agent as described above is heated to the boiling point or more of the alcohol as the dispersion medium of the alcohol dispersion to distill the alcohol as a dispersion medium of the alcohol dispersion out of the dispersion while adding an intended organic solvent to the dispersion.

By way of example of the methods, the alcohol dispersion of titanium oxide particles surface-treated with the surface treating agent is heated under an atmospheric pressure or a reduced pressure to distill the alcohol solvent, while adding an organic solvent at a rate preferably equal to the relevant distillation rate, thereby replacing the alcohol solvent as a dispersion medium of the alcohol dispersion of titanium oxide particles by the intended organic solvent.

As an alternative method, the surface treating agent is dissolved in an organic solvent as described in the surface treating process 3 and 4, and the resulting solution is added to the alcohol dispersion of titanium oxide particles, or the surface treating agent and the organic solvent are added to the alcohol dispersion of titanium oxide particles and the titanium oxide particles are subjected in the presence of the organic solvent to surface treatment with the surface treating agent, and thereafter heated under an atmospheric pressure or a reduced pressure, to distill the alcohol as a dispersion medium of the alcohol dispersion off, thereby also replacing the alcohol solvent as a dispersion medium of the alcohol dispersion of the titanium oxide particles by the organic solvent.

Accordingly, when the dispersion medium of the alcohol dispersion of titanium oxide particles is to be replaced by an organic solvent by means of such a distillation replacing method, the organic solvent used preferably has a boiling point which is almost equal to or higher than that of the alcohol under the distillation condition.

The ultrafiltration concentration replacing method is a method in which the alcohol dispersion of titanium oxide particles is subjected to ultrafiltration so that the alcohol solvent permeates through the membrane thereby removing the alcohol solvent from the alcohol dispersion while adding an intended organic solvent to the dispersion thereby replacing the alcohol solvent as a dispersion medium of the alcohol dispersion of titanium oxide particles by the organic solvent.

For example, the alcohol dispersion of titanium oxide particles is treated with the surface treating agent, and thereafter the resulting alcohol dispersion is pumped to an ultrafiltration module so that the alcohol solvent permeates through the membrane thereby removing the alcohol solvent from the dispersion, while adding an intended organic solvent stepwise or continuously to the dispersion, thereby replacing the alcohol solvent as a dispersion medium of the alcohol dispersion of titanium oxide particles by the organic solvent.

As set forth hereinabove, the method of the invention, using the alcohol dispersion of titanium oxide particles as a starting material, performs the surface treating process for surface treating the titanium oxide particles in the alcohol dispersion medium with the surface treating agent, and then the solvent replacing process for replacing the alcohol solvent as a dispersion medium of the alcohol dispersion of titanium oxide particles thus surface-treated with the surface treating agent by the aforesaid organic solvent. In this way, the method of the invention is hardly accompanied by agglomeration of titanium oxide particles, but provides an organic solvent dispersion of titanium oxide particle which has usually a content of titanium oxide particles of 10% by weight or more, preferably 15 to 40% by weight, of which D50 is in a range of 1 to 30 nm, preferably in a range of 1 to 20 nm, more preferably in a range of 2 to 10 nm, and which has a transmittance of 2% or more at a wavelength of 500 nm and a transmittance of 70% or more at a wavelength of 800 nm, and preferably a transmittance of 4% or more at a wavelength of 550 nm, and a transmittance of 8% or more at a wavelength of 600 nm, and has a viscosity of 10 mPa·s or less at 25° C. immediately after production while the increase in the viscosity is 40 mPa·s or less seven days after production as compared to that of the dispersion immediately after production.

Thus, according to the method of the invention, after the titanium oxide particles in the alcohol dispersion used as a starting material are surface-treated with the surface treating agent, or while the titanium oxide particles in the alcohol dispersion used as a starting material are v surface-treated with the surface treating agent, the alcohol solvent or the dispersion medium of the alcohol dispersion is replaced by the aforementioned organic solvent except methanol and ethanol, thereby a small dispersion diameter D50 of the titanium oxide particles in the alcohol dispersion is taken over to the resulting organic solvent dispersion of titanium oxide particles. As a result, the intended organic solvent dispersion of titanium oxide particles which has titanium oxide particles of a small D50 and which has a low viscosity and high stability and transparency is obtained.

Thus, the organic solvent dispersion of titanium oxide particles according to the invention contains the titanium oxide particles in a high content, has a low viscosity, while it is superior in stability and transparency, and in addition, the titanium oxide particles retain their desirable properties that they inherently possess.

The alcohol dispersion of titanium oxide particles used in the surface treating process in the method for producing an organic solvent dispersion of titanium oxide particles according to the invention may be one which is commercially available. However, according to the invention, the alcohol dispersion of titanium oxide particles used in the surface treating process is preferably such that it is obtained by adding acetic acid and nitric acid in combination to an aqueous slurry of titanium oxide to deflocculate the titanium oxide particles and the resultant is wet-dispersed to obtain an aqueous dispersion, and then by replacing the dispersion medium of the aqueous dispersion by the aforementioned alcohol.

The production of the alcohol dispersion of titanium oxide particles preferably used in the surface treating process in the method for producing an organic solvent dispersion of titanium oxide particles according to the invention is now described.

The alcohol dispersion of titanium oxide particles preferably used in the surface treating process in the method of the invention is obtained by the process comprising the steps described below:

(a) a step of wet dispersing an aqueous slurry of titanium oxide particles in the presence of acetic acid and nitric acid using a medium agitating mill or a high pressure dispersing machine to obtain an aqueous slurry of titanium oxide particles;

(b) a step of washing the aqueous slurry of titanium oxide particles obtained in the step (a); and (c) a step of replacing the dispersion medium of the aqueous dispersion of the aqueous slurry of titanium oxide particles obtained in the step (b) by at least one alcohol solvent selected from methanol and ethanol.

In the process for production of the above-mentioned alcohol dispersion of titanium oxide particles, the aqueous slurry of titanium oxide particles used as a starting material is not particularly limited in its origin. Therefore, in the invention, for example, an aqueous slurry of titanium oxide particles obtained by dispersing titanium oxide powder in water may be used.

However, the aqueous slurry of titanium oxide particles used as a starting material in the production of the alcohol dispersion of titanium oxide particles in the invention is preferably such that it is obtained by the method below mentioned, for example.

That is, the aqueous slurry of titanium oxide particles used as a starting material in the production of the alcohol dispersion of titanium oxide particles in the invention is obtained preferably by the method which is as follows.

(1) a first step in which after a chloride ion concentration of an aqueous solution of titanium tetrachloride is adjusted to 0.5 mole/L or more, and less than 4.4 mole/L, the aqueous solution of titanium tetrachloride is heated at a temperature in a range of from 25° C. to 75° C. to hydrolyze the titanium tetrachloride, thereby obtaining an aqueous slurry containing the thus precipitated rutile titanium oxide particles;

(2) a second step in which the aqueous slurry obtained in the first step is filtered and washed with water to remove water-soluble salts dissolved therein from the aqueous slurry;

(3) a third step in which the aqueous slurry obtained in the second step is subjected to a hydrothermal reaction in the presence of an organic acid; and (4) a fourth step in which the aqueous slurry obtained in the third step is filtered and washed with water to remove water-soluble salts dissolved therein from the aqueous slurry, and the titanium oxide particles thus obtained are repulped in water.

And, according to the method of the invention, it is preferred that the aqueous slurry of titanium oxide particles thus obtained is subjected to the steps (a) to (c) mentioned hereinbefore thereby to replace the water as the dispersion medium of the aqueous slurry by the alcohol, and then the alcohol dispersion of titanium oxide particles thus obtained is subjected to the surface treating process and the solvent replacing process mentioned hereinbefore to obtain the intended organic solvent dispersion of titanium oxide particles.

The process for production of the above-mentioned aqueous slurry of titanium oxide particles is described below.

The first step is a step in which titanium tetrachloride is hydrolyzed in water so that particles of rutile titanium oxide are precipitated, thereby to obtain a slurry containing such particles of rutile titanium oxide. In more detail, in the first step, water is added to an aqueous solution of titanium tetrachloride so that it has a content of titanium oxide ($TiO_2$, hereinafter the same) in a range of 10 to 100 g/L, and a chloride ion concentration of 0.5 mole/L or more, and less than 4.4 mole/L. Subsequently, the aqueous solution is heated at a temperature in a range of 25-75° C. for 1-10 hours, although not limited, so that the titanium tetrachloride is hydrolyzed and rutile titanium oxide particles are precipitated.

Upon such hydrolysis of titanium tetrachloride as mentioned above, when the chloride ion concentration of the aqueous solution of titanium tetrachloride is 4.4 mole/L or more, it is difficult to hydrolyze the aqueous solution of titanium tetrachloride at a practical rate at a hydrolysis temperature of 75° C. or less. On the other hand, when the chloride ion concentration of the aqueous solution of titanium tetrachloride is less than 0.5 mole/L, the concentration is too small to hydrolyze the aqueous solution of titanium tetrachloride in an industrial scale, that is, such a hydrolysis process is neither efficient nor practical.

When the hydrolysis temperature of aqueous solution of titanium tetrachloride is more than 75° C., the hydrolysates of titanium tetrachloride formed often get mixed with anatase titanium oxide or brookite titanium oxide if the chloride ion concentration of the aqueous solution of titanium tetrachloride is adjusted at 0.5 mole/L or more, and less than 4.4 mole/L.

The hydrolysis rate of titanium tetrachloride depends on hydrolysis temperature, and the higher the temperature, the higher the hydrolysis rate. Therefore, higher temperature is industrially advantageous. When the hydrolysis temperature is less than 25° C., it is difficult to carry out the hydrolysis of titanium tetrachloride at a practical rate.

It is particularly preferred that in the first step, water is added to an aqueous solution of titanium tetrachloride to adjust the chlorine concentration of the solution at 1.0 mole/L or more, and 4.3 mole/L or less, and then the solution is heated at a temperature of 30-75° C. for 1-5 hours, although not limited, thereby to hydrolyze titanium tetrachloride and precipitate rutile titanium oxide particles.

The second step is a step in which the slurry obtained in the first step is filtered and washed with water to remove water-soluble salts dissolved therein from the slurry. In the second step, although the means and procedures for filtering and washing the slurry with water are not particularly limited, but the slurry can be efficiently filtered and washed with water by adding a suitable alkali to the slurry before it is filtered to adjust the pH to an isoelectric point of titanium oxide.

The third step is a step in which the slurry obtained in the second step is subjected to a hydrothermal reaction in the presence of an organic acid, which is a particle growth inhibiting agent, to increase the crystallinity of the rutile titanium oxide particles, while the particle growth is inhibited. As the organic acid, carboxylic acids and hydroxycarboxylic acids are used, and their salts may also be used. Concrete examples of the organic acid may include monocarboxylic acids such as formic acid, acetic acid, and propionic acid, and their salts; polybasic acids such as oxalic acid, malonic acid, succinic acid, fumaric acid, and maleic acid, and their salts; hydroxycarboxylic acids such as lactic acid, malic acid, tartaric acid, citric acid, and gluconic acid, and their salts. As the salts of the carboxylic acid and the hydroxycarboxylic acid, for example, alkali metal salts such as sodium salts and potassium salts are preferably used.

In the third step, by using the organic acid in an amount of 75 parts by mole or more per 100 parts by mole of titanium oxide, the crystallinity of rutile titanium oxide particles obtained by the hydrothermal reaction is effectively increased while the growth of rutile titanium oxide particles obtained is inhibited. When the amount of the organic acid is less than 75 parts by mole per 100 parts by mole of titanium oxide, the effect for inhibiting the growth of rutile titanium oxide particles are not obtained in the hydrothermal reaction. A preferred amount of the organic acid is 85 parts by mole or more per 100 parts by mole of titanium oxide. On the other hand, the upper limit of the amount of the organic acid used relative to titanium oxide is not particularly limited, but even if a too much amount of the organic acid is used, the effect for increasing the crystallinity of rutile titanium oxide particles is not improved any more. Therefore, an amount of 200 parts by mole or less of the organic acid per 100 parts by mole of titanium oxide is usually enough.

In the third step, the temperature at which the hydrothermal reaction is performed is in a range of 120 to 180° C. When the temperature is lower than 120° C., the crystallinity of rutile titanium oxide particles obtained cannot be increased. On the other hand, when it is higher than 180° C., the particles grow remarkably. That is, it is difficult to increase the crystallinity while the particle growth is inhibited. In particular, according to the invention, it is advantageous to perform the hydrothermal reaction at a temperature in a range of 140 to 160° C. because not only the crystallinity of rutile titanium oxide particles obtained is increased while the growth of rutile titanium oxide particles is inhibited, but also the effects described above are obtained in a short time.

The fourth step is a step in which a suitable alkali such as an aqueous solution of sodium hydroxide is added to the slurry obtained by the hydrothermal reaction to neutralize the organic acid in the slurry, and then the slurry is filtered and washed with water to remove the water-soluble salts dissolved therein from the slurry, followed by repulping the resultant in water to obtain the intended aqueous slurry of titanium oxide particles.

In the fourth step, the means and procedures for filtering and washing the slurry with water are not also particularly limited, but as mentioned above, the slurry is efficiently filtered and washed with water by adding a suitable alkali to the slurry before it is filtered to adjust the pH of the slurry to an isoelectric point of titanium oxide. In the fourth step, it is further preferable that the slurry is filtered and washed with water so that the slurry has an electric conductivity of 100 µS/cm or less when the slurry is repulped in water so that it has a concentration of 100 g/L of rutile titanium oxide particles.

According to the invention, as described above, it is preferred that the aqueous slurry of titanium oxide particles is obtained, and then it is subjected to the steps (a) to (c) as mentioned hereinbefore to obtain the alcohol dispersion of titanium oxide particles, and then it is subjected to the surface treating process and the solvent displacing process described hereinbefore.

The process for producing an alcohol dispersion of titanium oxide particles which is preferably used in the surface treating process according to the invention is described below.

The step (a) mentioned hereinbefore is a step in which the aqueous slurry obtained in the fourth step of the process for producing the aqueous slurry of titanium oxide particles described above is deflocculated in the presence of acetic acid and nitric acid, and then the resultant is subjected to a wet dispersion treatment to obtain an aqueous dispersion.

According to the invention, as described above, after acetic acid and nitric acid are added to the aqueous slurry of titanium oxide particles and the titanium oxide particles are deflocculated, the resultant is subjected to a wet dispersing treatment. Therefore, even if the proportion of the alcohol as the dispersion medium in the obtained dispersion increases when the water, i.e., the dispersion medium of the aqueous slurry of titanium oxide particles is replaced by the alcohol in the step (c), there is obtained an alcohol dispersion of titanium oxide particles superior in dispersibility and transparency while suppressing agglomeration of the titanium oxide particles in the resulting dispersion.

When nitric acid alone is added to the aqueous slurry of titanium oxide particles to deflocculate the titanium oxide particles, and then the resultant is subjected to a wet dispersion treatment, there arises a problem that as the proportion of the alcohol as the dispersion medium increases, the titanium oxide particles agglomerate in the dispersion obtained, and the dispersibility and the transparency of the dispersion are impaired when the water, i.e., the dispersion medium of the aqueous slurry is replaced by the alcohol.

On the other hand, when only acetic acid is added to the aqueous slurry of titanium oxide particles to deflocculate the titanium oxide particles, and the resultant is subjected to a wet dispersion treatment, the resulting dispersion suffers increase of viscosity, and finally it loses fluidity and gels as the water-soluble salts are removed from the dispersion in the step (b).

According to the invention, when acetic acid and nitric acid are added to the aqueous slurry of titanium oxide particles to deflocculate the titanium oxide particles, it is preferred that acetic acid is used in a range of 15 to 250 mol parts, and nitric acid in a range of 15 to 90 molar parts, each in relation to 100 mol parts of titanium oxide.

The wet dispersion treatment in the step (a) employs a medium agitating mill or a high pressure dispersing machine. A bead mill is preferably used as the medium agitating mill, for example. As the beads, those having a Mohs hardness higher than that of titania is preferable, and for example, zirconia beads are preferably used. According to a preferred embodiment, zirconia beads having a diameter of 15 to 300 µm are charged in a bead mill and the aqueous slurry of titanium oxide is subjected to wet dispersion treatment to obtain an aqueous dispersion of rutile titanium oxide particles.

The step (b) is a step of removing the water-soluble salts dissolved in the aqueous dispersion obtained in the step (a)

so as to impart dispersion stability to the dispersion obtained in the step (a). Means and methods for removing the water-soluble salts dissolved in the aqueous dispersion are not particularly limited, but dialysis, ultrafiltration or the like are used, for example.

Since the aqueous dispersion of titanium oxide obtained in the step (a) contains acetic acid and nitric acid used as a deflocculant, it has an electrical conductivity usually larger than 10 mS/cm. However, when the electric conductivity of the aqueous dispersion is made in a range of 0.1 to 5 mS/cm, preferably in a range of 1 to 3 mS/cm in the step (b), an aqueous dispersion of titanium oxide particles superior in dispersion stability is obtained.

As described above, according to the invention, titanium tetrachloride is hydrolyzed in an aqueous solution to precipitate rutile titanium oxide particles, which are then hydrothermally treated in the presence of an organic acid to improve the crystallinity of the particles while suppressing the growth of the particles, and then a combination of acetic acid and nitric acid is added to the aqueous slurry of the thus obtained rutile titanium oxide particles to deflocculate the particles, and then the resultant is subjected to a wet dispersing treatment, followed by removing an excessive amount of the acids and the water-soluble salts dissolved therein. Thus, an aqueous dispersion of rutile titanium oxide particles is obtained in which the rutile titanium oxide particles are stably dispersed without agglomeration.

In this way, according to the method described above, starting from titanium tetrachloride, an aqueous dispersion of titanium oxide particles which has a content of titanium oxide particles of 10% by weight or more, and which has titanium oxide particles whose D50 is in a range of 1 to 20 nm, preferably in a range of 2 to 10 nm, and whose D90 is 40 nm or less, based on the particle size distribution measured by the dynamic light scattering method, and which has a transmittance of 50% or more at a wavelength of 500 nm, a transmittance of 90% or more at a wavelength of 800 nm, and a viscosity of 20 mPa·s, preferably 10 mPa·s or less, at a temperature of 25° C., immediately after the production of the aqueous dispersion, is obtained.

Then, the water, i.e., the dispersion medium of the aqueous dispersion of titanium oxide particles thus obtained, is replaced by the alcohol solvent, to provide an alcohol dispersion of titanium oxide particles which is preferably used in the production of organic solvent dispersion of titanium oxide particles according to the invention. That is, the alcohol dispersion of titanium oxide particles which has a content of 10% by weight or more of titanium oxide particles, which contains titanium oxide particles whose D50 is in a range of 1 to 20 nm, preferably 2 to 10 nm, whose D 90 is 40 nm or less, and which has a transmittance of 40% or more at a wavelength of 500 nm, a transmittance of 80% or more at a wavelength of 800 nm, and a viscosity of 20 mPa·s or less, preferably 10 mPa·s or less at a temperature of 25° C. immediately after the production is obtained.

According to the invention, by using such an alcohol dispersion of titanium oxide particles as a starting material described above, an intended organic solvent dispersion of titanium oxide particles is obtained readily and stably.

EXAMPLES

The following Reference Examples are examples of preparation of aqueous dispersions and alcohol dispersions of titanium oxide particles. In these Reference Examples, ultrafiltration was conducted using "Microza" manufactured by Asahi Kasei Chemicals Corporation (Model ACP-1010D, molecular weight cutoff 13000).

The following Examples and Comparative Examples are examples of preparation of organic solvent dispersions of titanium oxide particles using the alcohol dispersions of titanium oxide particles obtained in the following Reference Examples.

The dispersion diameters of titanium oxide particles, i.e., the sizes (diameters) of titanium oxide particles in the aqueous dispersions and alcohol dispersions of titanium oxide particles of the following Reference Examples as well as the organic solvent dispersions of the following Examples and Comparative Examples, the turbidimetric transmittance, the transmittances at wavelengths of 500 nm, 550 nm, 600 nm and 800 nm and the viscosities of the organic solvent dispersions were measured as described below.

The dispersion diameter of titanium oxide particles was measured by a dynamic light scattering method (Model UPA-UT manufactured by Nikkiso Co., Ltd.).

The turbidimetric transmittance of dispersion of titanium oxide particles was measured using a haze meter (Model NDH4000 manufactured by Nippon Denshoku Industries Co., Ltd.). The light transmittance $T_0$ (blank level) was measured with the cell having an optical path length of 10 mm filled with ion exchange water, and the light transmittance T with the cell filled with the dispersion. The turbidimetric transmittance of dispersion was calculated based on an equation: $(T/T_0) \times 100$.

The transmittances at wavelengths of 500 nm, 550 nm, 600 nm and 800 nm were measured using a visible-ultraviolet spectrophotometer (Model V-570 manufactured by JASCO Corporation) with a cell having an optical path length of 10 mm filled with the dispersion.

The viscosity was measured using a turning fork vibration SV viscometer (Model SV-1A manufactured by A&D Company, Limited (measurable viscosity ranging from 0.3 to 1000 mPa·s)).

The abbreviations below stand for the following organic solvents.

MEK: Methyl ethyl ketone
MIBK: Methyl isobutyl ketone
IPA: Isopropyl alcohol
PGME: Propylene glycol monomethyl ether]
DMAC: N,N-dimethylacetamide
DMSO: Dimethylsulfoxide
DMIB: N,N,2-trimethylpropionamide Reference Example 1

(Preparation of Aqueous Dispersion of Rutile Titanium Oxide Particles (I)):

In a separable flask equipped with a reflux apparatus were placed 3 L of aqueous solution of titanium tetrachloride having a chloride ion concentration of 2.3 mole/L and a titanium ion concentration of 50.7 g/L in terms of titanium oxide, and heated at a temperature of 70° C. for 3 hours so that the titanium tetrachloride was hydrolyzed, thereby an aqueous slurry containing the thus precipitated rutile titanium oxide particles was obtained (first step).

The aqueous slurry was filtered through a filter paper made of glass fiber having a collection diameter of 300 nm to remove unreacted titanium tetrachloride and components dissolved therein. The thus obtained rutile titanium oxide particles were repulped in water to prepare an aqueous slurry. An aqueous solution of sodium hydroxide was added to the aqueous slurry until it reached a pH of 7.0. The resulting slurry was then filtered through a filter paper made of glass fiber having a collection diameter of 300 nm, wherein the slurry was filtered and washed with water to remove water-soluble salts dissolved therein from the slurry so that when the rutile titanium oxide particles obtained were repulped in water in an amount of 50 g/L in terms of titanium oxide, the resulting slurry came to have an electric conductivity of 100 μS/cm or less (second step).

The rutile titanium oxide particles obtained in the second step were repulped in water so that the resulting slurry had a content of 50 g/L of rutile titanium oxide in terms of titanium oxide. Acetic acid was added to the slurry in an amount of 150 parts by mole per 100 parts by mole of the titanium oxide in the slurry. The resulting mixture was subjected to a hydrothermal reaction at 150° C. for 3 hours to increase the crystallinity of rutile titanium oxide particles (third step).

An aqueous solution of sodium hydroxide was added to the slurry obtained by the hydrothermal reaction described above until the slurry had a pH of 5.0. The slurry was then filtered through a filter paper made of glass fiber having a collection diameter of 300 nm, wherein the slurry was filtered and washed with water to remove water-soluble salts dissolved therein from the slurry so that when the rutile titanium oxide particles obtained were repulped in water in an amount of 100 g/L in terms of titanium oxide, the resulting slurry had an electric conductivity of 100 μS/cm or less. The thus obtained rutile titanium oxide particles were repulped in water in an amount of 100 g/L in terms of titanium oxide to obtain an aqueous slurry of titanium oxide particles (fourth step).

Then, acetic acid and nitric acid were added to the aqueous slurry obtained in an amount of 150 parts by mole and 50 parts by mole, respectively, each per 100 parts by mole of titanium oxide, to deflocculate the titanium oxide particles. The aqueous slurry of titanium oxide particles thus obtained was subjected to wet dispersion for 10 hours using a circulation type bead mill "Ultra Apex Mill UAM-05" manufactured by Kotobuki Kogyo K.K. to obtain an aqueous dispersion of rutile titanium oxide particles wherein there were used zirconia beads having a diameter of 30 μm, and a rotation rate of bead mill of 2350 rpm (Step (a))

The aqueous dispersion of rutile titanium oxide particles obtained was washed with an ultrafiltration membrane to remove excess of the acids and water soluble salts dissolved therein until it had an electric conductivity of 3.2 mS/cm, followed by concentration to obtain an aqueous dispersion of titanium oxide particles having a content of 15% by weight of rutile titanium oxide particles (Step (b)).

The thus obtained aqueous dispersion of titanium oxide particles (I) was found to have a transmittance of 65.1% at a wavelength of 500 nm and a transmittance of 95.9% at a wavelength of 800 nm, and a viscosity of 2 mPa·s at a temperature of 25° C. immediately after production.

Water was removed from the aqueous dispersion of titanium oxide particles (I) obtained, and the titanium oxide particles thus obtained were dried. The powder of titanium oxide particles obtained thus was observed with a TEM (transmission electron microscope) to find that the titanium oxide particles had an average primary particle diameter of about 4 nm.

On the other hand, the titanium oxide particles in the aqueous dispersion of titanium oxide particles (I) were found to have a dispersion diameter of D50 of 4 nm and D90 of 6.4 nm. Accordingly, it was found that the titanium oxide particles hardly agglomerated in the aqueous dispersion obtained.

(Preparation of Methanol Dispersion of Titanium Oxide (II))

500 g of the aqueous dispersion of titanium oxide particles (I) was concentrated using an ultrafiltration membrane, while the same amount of methanol as the amount of the filtrate obtained was added to the concentrated dispersion thus obtained. In this way, the dispersion was concentrated while it was diluted with methanol simultaneously and consecutively in parallel thereby maintaining the content of titanium oxide particles in the dispersion at 15% by weight while the dispersion medium of the dispersion, i.e., water, was replaced by methanol (Step (c)), to provide a methanol dispersion of titanium oxide particles (II) having a content of 15% by weight of titanium oxide particles. The methanol used for the dilution amounted to 2 L.

The methanol dispersion of titanium oxide particles (II) thus obtained was found to have a transmittance of 57% at a wavelength of 500 nm, and a transmittance of 95% at a wavelength of 800 nm, and a viscosity of 1 mPa·s at a temperature of 25° C. immediately after production.

Methanol was removed from the methanol dispersion of titanium oxide particles (II), and the titanium oxide particles obtained were dried. The powder of titanium oxide particles was observed with a TEM (transmission electron microscope) to show that the titanium oxide particles had an average primary particle diameter of about 4 nm.

On the other hand, the titanium oxide particles in the methanol dispersion (II) had a dispersion diameter of D50 of 4 nm and D90 of 9.2 nm. Accordingly, it was found that the titanium oxide particles hardly agglomerated in the methanol dispersion obtained.

Reference Example 2

(Preparation of Aqueous Dispersion of Anatase Titanium Oxide Particles (III))

An aqueous slurry of anatase titanium oxide particles (CSB-M) manufactured by Sakai Chemical Industry Co., Ltd. was diluted with water to have a titanium oxide content of 100 g/L. Acetic acid and nitric acid were added to the aqueous slurry of titanium oxide particles in an amount of 150 parts by mole and 50 parts by mole, respectively, each per 100 parts by mole of titanium oxide to deflocculate the titanium oxide particles. The aqueous slurry of titanium oxide particles thus obtained was subjected to wet dispersion treatment for 10 hours using a circulation type bead mill "Ultra Apex Mill UAM-05" manufactured by Kotobuki Kogyo K.K. to obtain an aqueous dispersion of anatase titanium oxide particles wherein there were used zirconia beads having a diameter of 30 μm, and a rotation speed of bead mill of 2350 rpm (Step (a))

The aqueous dispersion of anatase titanium oxide particles was washed with an ultrafiltration membrane until it had an electric conductivity of 3.2 mS/cm to remove excess of the acids and water soluble salts dissolved therein, followed by concentration to obtain an aqueous dispersion of titanium oxide particles (III) having a content of 15% by weight of anatase titanium oxide particles (Step (b)).

The aqueous dispersion of titanium oxide particles (III) thus obtained was found to have a transmittance of 77.2% at a wavelength of 500 nm, and a transmittance of 97.2% at a wavelength of 800 nm, and a viscosity of 3 mPa·s at a temperature of 25° C. immediately after production.

Water was removed from the aqueous dispersion of titanium oxide particles (III), and the titanium oxide particles obtained were dried. The powder of titanium oxide particles was observed with a TEM (transmission electron microscope) to show that the titanium oxide particles had an average primary particle diameter of about 5 nm.

On the other hand, the titanium oxide particles in the aqueous dispersion (III) had a dispersion diameter of D50 of 5 nm and D90 of 5.8 nm. Accordingly, it was found that the titanium oxide particles hardly agglomerated in the aqueous dispersion obtained.

(Preparation of Methanol Dispersion of Titanium Oxide (IV))

500 g of the aqueous dispersion of titanium oxide particles (III) was concentrated using an ultrafiltration membrane, while the same amount of methanol as the amount of the filtrate obtained was added to the concentrated dispersion thus obtained. In this way, the dispersion was concentrated while it was diluted with methanol simultaneously and consecutively in parallel thereby maintaining the content of titanium oxide particles in the dispersion at 15% by weight while the dispersion medium of the dispersion, i.e., water, was replaced with methanol (Step (c)), to provide a methanol dispersion of titanium oxide particles (IV) having a content of 15% by weight of titanium oxide particles. The methanol used for the dilution amounted to 2 L. [0123]

The methanol dispersion of titanium oxide particles (IV) thus obtained was found to have a transmittance of 66% at a wavelength of 500 nm, and a transmittance of 96% at a wavelength of 800 nm, and a viscosity of 1 mPa·s at a temperature of 25° C. immediately after production.

Methanol was removed from the methanol dispersion of titanium oxide particles (IV), and the titanium oxide particles obtained were dried. The powder of titanium oxide particles was observed with a TEM (transmission electron microscope) to show that the titanium oxide particles had an average primary particle diameter of about 5 nm.

On the other hand, the titanium oxide particles in the methanol dispersion (IV) had a dispersion diameter of D50 of 5 nm and D90 of 6.2 nm. Accordingly, it was found that the titanium oxide particles hardly agglomerated in the methanol dispersion (IV) obtained.

The displacing organic solvent used, surface treating agent used, surface treatment temperature employed, and solid content and content of titanium oxide particles of the organic solvent dispersion obtained and solvent displacement rates in the organic solvent dispersions obtained in the following Examples 1 to 39 and Comparative Examples 1 to 17 are shown in Tables 1, 2, and 5. The tubidimetric transmittance and transmittance at a wavelength of 500 nm, 550 nm, 600 nm and 800 nm of organic solvent dispersion obtained, and particle size distribution and viscosity of organic solvent dispersion obtained are shown in Tables 3, 4, and 6. The solvent displacing process employed is described in Examples 1, 2, 3, and 4.

The solid content, content of titanium oxide particles, and solvent displacement rate are determined as follows.
Solid content (S):

When W parts by weight of dispersion obtained were put on a drying saucer, and dried to provide w parts by weight of dried product, the solid content S is determined by the following equation:

$$S=(w/W)\times 100.$$

Content of titanium oxide particles (T):

As the content of titanium oxide particles is a proportion of titanium oxide particles in the solid content of the dispersion obtained, it is determined by the following equation:

$$T=S\times 100/(100+p)$$

when the amount of surface treating agent used is p parts by weight in relation to 100 parts by weight of titanium oxide particles.

Solvent displacement rate;

The dispersion obtained was dissolved in deuterochloroform to prepare a sample, which was subjected to measurement of one-dimensional NMR spectrum of protons using a nuclear magnetic resonance apparatus (AV400M manufactured by Bruker BioSpin AG). Based on the NMR spectrum obtained, the area ratio (ratio of amount of substance) of peak of each solvent was converted to a mass ratio to calculate a solvent ratio, and a solvent displacement ratio was determined based on the solvent ratio.

In Tables 1, 2, and 5, HSA in the column of surface treating agent stands for 12-hydroxystearic acid; (a) to (m) stand for silane coupling agents used; and the numeral values in the column of surface treating agent stand for the amount of surface treating agent used in terms of parts by weight in relation to 100 parts by weight of titanium oxide.

The silane coupling agents (a) to (m) stand for as follows.
(a): 3-methacryloyloxypropyltrimethoxysilane
(b): 3-methacryloyloxypropylmethyldimethoxysilane
(c): 3-methacryloyloxypropyltriethoxysilane
(d): hexyltrimethoxysilane
(e): vinyltrimetoxysilane
(f): 3-acryloyloxypropyltrimethoxysilane
(g): decyltrimetoxysilane
(h): trifluoropropyltrimetoxysilane
(i): methyltrimethoxysilane
(j): dimethyldimethoxysilane
(k): N-2-(aminoethyl)-3-aminopropyltrimethoxysilane
(l): 3-glycidoxypropyltrimetoxysilane
(m): 2-(3,4-epoxycyclohexyl)ethyltrimethoxysilane Example 1

1.5 g of 3-methacryloyloxypropyltrimethoxysilane (10.0 parts by weight in relation to 100 parts by weight of titanium oxide) and 1.5 g of 12-hydroxystearic acid (10.0 parts by weight in relation to 100 parts by weight of titanium oxide) were added to 100 g of the methanol dispersion of titanium oxide particles (II) obtained in Reference Example 1. The resultant was stirred for 5 minutes at a temperature of 26° C. to surface-treat the dispersion with the surface treating agent.

While the methanol dispersion of titanium oxide particles thus treated was heated under an atmospheric pressure to distill the methanol out of the dispersion, MEK was added dropwise to the dispersion at the same rate as the rate at which the methanol was distilled, thereby performing solvent replacement, to provide an about 15% by weight MEK dispersion of titanium oxide particles.

As mentioned above, the solvent displacing process 1 refers to a process in which, while a methanol dispersion of titanium oxide particles is heated under an atmospheric pressure to distil the methanol out of the dispersion, an organic solvent is added to the dispersion at the same rate at which the methanol is distilled, thereby performing solvent displacement.

Example 2

1.5 g of 3-methacryloyloxypropyltrimethoxysilane (10.0 parts by weight in relation to 100 parts by weight of titanium oxide) and 1.5 g of 12-hydroxystearic acid (10.0 parts by weight in relation to 100 parts by weight of titanium oxide) were added to 100 g of the methanol dispersion of titanium oxide particles (II) obtained in Reference Example 1, and then MEK was added to the resultant, followed by stirring the resulting dispersion of titanium oxide particles in a mixture of methanol and MEK for 5 minutes at a temperature of 24° C., thereby surface treating the dispersion with the surface treating agent.

The dispersion of titanium oxide particles thus treated was heated under an atmospheric pressure to distill the methanol out of the dispersion, thereby performing solvent displacement, to provide an about 15% by weight MEK dispersion of titanium oxide particles.

As mentioned above, the solvent displacing process 2 refers to a process in which the surface treating agent is added to a methanol dispersion of titanium oxide particles, and then an organic solvent is added to the resultant dispersion to surface-treat the dispersion, and then the methanol is distilled out of the resultant under an atmospheric pressure, thereby performing solvent displacement.

Example 3

1.5 g of 3-methacryloyloxypropyltrimethoxysilane (10.0 parts by weight in relation to 100 parts by weight of titanium oxide) and 1.5 g of 12-hydroxystearic acid (10.0 parts by weight in relation to 100 parts by weight of titanium oxide) were added to 100 g of the methanol dispersion of titanium oxide particles (II) obtained in Reference Example 1, and then MEK was added to the resulting dispersion. The resulting dispersion of titanium oxide particles in a mixture of methanol and MEK was stirred for 5 minutes at a temperature of 25° C., thereby surface treating the dispersion with the surface treating agent.

The dispersion of titanium oxide particles thus treated was heated under a reduced pressure to distill the methanol out of the dispersion, thereby performing solvent displacement to provide an about 15% by weight MEK dispersion of titanium oxide particles.

As mentioned above, the solvent displacing process 3 refers to a process in which the surface treating agent is added to a methanol dispersion of titanium oxide particles, and then an organic solvent is added to the resulting dispersion to surface-treat the dispersion, and then the methanol is distilled under a reduced pressure out of the resultant thereby performing solvent displacement.

Example 4

A solution of 1.5 g of 3-methacryloyloxypropyltrimethoxysilane (10.0 parts by weight in relation to 100 parts by weight of titanium oxide) and 1.5 g of 12-hydroxystearic acid (10.0 parts by weight in relation to 100 parts by weight of titanium oxide) in MEK was added to 100 g of the methanol dispersion of titanium oxide particles (II) obtained in Reference Example 1. Then, the resulting dispersion of titanium oxide particles in a mixture of methanol and MEK was stirred for 5 minutes at a temperature of 24° C., thereby surface treating the dispersion with the surface treating agent.

The dispersion of titanium oxide particles thus treated was heated under an atmospheric pressure to distill the methanol out of the dispersion, thereby performing solvent displacement, to provide an about 15% by weight MEK dispersion of titanium oxide particles.

As mentioned above, the solvent displacing process 4 refers to a process in which a solution of the surface treating agent dissolved in an organic solvent is added to a methanol dispersion of titanium oxide particles to surface-treat the dispersion, and then the methanol is distilled out of the resultant thereby performing solvent displacement.

Examples 5-37

A silane coupling agent and 12-hydroxystearic acid (and an organic solvent) were added each in an amount indicated in Tables 1 and 2, respectively, to 100 g of the methanol dispersion of titanium oxide particles (II) obtained in Reference Example 1. The resulting dispersion of titanium oxide particles in methanol (and the organic solvent) was stirred for 5 minutes at the temperature indicated in Tables 1 and 2, thereby surface treating the dispersion with the surface treating agent.

Each of the dispersions of titanium oxide particles thus treated was subjected to solvent displacement by either of the solvent displacing processes 1, 2, 3 and 4, as indicated in Tables 1 and 2, to provide an about 15% by weight organic solvent dispersion of titanium oxide particles.

Examples 38 and 39

A silane coupling agent and 12-hydroxystearic acid (and an organic solvent) were added each in an amount indicated in Table 2, to 100 g of the methanol dispersion of titanium oxide particles (IV) obtained in Reference Example 2. The resulting dispersion of titanium oxide particles in methanol (and the organic solvent) was stirred for 5 minutes at the temperature indicated in Table 2, thereby surface treating the dispersion with the surface treating agent.

Each of the dispersions of titanium oxide particles thus treated was subjected to solvent displacement by the solvent displacing process indicated in Table 2, to provide an about 15% by weight organic solvent dispersion of titanium oxide particles.

Comparative Example 1

Neither 3-methacryloyloxypropyltrimethoxysilane nor 12-hydroxystearic acid was added to the methanol dispersion of titanium oxide particles (II) obtained in Reference Example 1, but MEK only was added. The resulting dispersion of titanium oxide particles in a mixture of methanol and MEK was stirred for 5 minutes at a temperature of 23° C.

The dispersion thus obtained was subjected to solvent displacement by the solvent displacing process 3, but the titanium oxide particles agglomerated to cause the dispersion to become clouded in the middle of solvent displacement. An intended MEK dispersion was not obtained.

Comparative Example 2

1.5 g of 3-methacryloyloxypropyltrimethoxysilane (10.0 parts by weight in relation to 100 parts by weight of titanium oxide) was added to 100 g of the methanol dispersion of titanium oxide particles (II) obtained in Reference Example 1, and then MEK was added. The resulting dispersion of titanium oxide particles in a mixture of methanol and MEK was stirred for 5 minutes at a temperature of 24° C. thereby surface treating the dispersion with the surface treating agent.

The dispersion of titanium oxide particles thus treated was subjected to solvent displacement by the solvent displacing process 3, but the titanium oxide particles agglomerated to cause the dispersion to become clouded in the middle of solvent displacement. An intended MEK dispersion was not obtained.

Comparative Example 3

1.5 g of 12-hydroxystearic acid (10.0 parts by weight in relation to 100 parts by weight of titanium oxide) was added to 100 g of the methanol dispersion of titanium oxide particles (II) obtained in Reference Example 1, and then MEK was added. The resulting dispersion of titanium oxide particles in a mixture of methanol and MEK was stirred for 5 minutes at a temperature of 25° C. thereby surface treating the dispersion with the surface treating agent.

The dispersion of titanium oxide particles thus treated was subjected to solvent displacement by the solvent displacing process 3, but the dispersion lost fluidity and gelled in the middle of solvent displacement. An intended MEK dispersion was not obtained.

Comparative Example 4

3 g of 3-methacryloyloxypropyltrimethoxysilane (20.0 parts by weight in relation to 100 parts by weight of titanium oxide) was added to 100 g of the methanol dispersion of titanium oxide particles (II) obtained in Reference Example 1, and then MEK was added. The resulting dispersion of titanium oxide particles in a mixture of methanol and MEK was stirred for 5 minutes at a temperature of 26° C. thereby surface treating the dispersion with the surface treating agent.

The dispersion of titanium oxide particles thus treated was subjected to solvent displacement by the solvent displacing process 3, but the titanium oxide particles agglomerated to cause the dispersion to become clouded in the middle of solvent displacement. An intended MEK dispersion was not obtained.

Comparative Examples 5-7

One or both of a silane coupling agent and 12-hydroxystearic acid were added each in an amount indicated in Table 5 together with MEK to 100 g of the methanol dispersion of titanium oxide particles (II) obtained in Reference Example 1. The resulting dispersion of titanium oxide particles in a mixture of methanol and MEK was stirred for 5 minutes at the temperature shown in Table 5, thereby surface treating the dispersion with the surface treating agent.

The dispersion of titanium oxide particles thus treated was subjected to solvent displacement by the solvent displacing process 3, but the dispersion lost fluidity and gelled in the middle of solvent displacement. An intended MEK dispersion was not obtained.

Comparative Examples 8 and 9

A silane coupling agent and 12-hydroxystearic acid were added each in an amount indicated in Table 5 together with MEK to 100 g of the methanol dispersion of titanium oxide particles (II) obtained in Reference Example 1. The resulting dispersion of titanium oxide particles in a mixture of methanol and MEK was stirred for 5 minutes at the temperature shown in Table 5, thereby surface treating the dispersion with the surface treating agent.

The dispersion of titanium oxide particles thus treated was subjected to solvent displacement by the solvent displacing process 3 to provide an about 15% by weight organic solvent dispersion of titanium oxide particles, which, however, gelled soon.

Comparative Example 10

1.5 g of 3-methacryloyloxypropyltrimethoxysilane (10.0 parts by weight in relation to 100 parts by weight of titanium oxide) and 1.5 g of stearic acid (10.0 parts by weight in relation to 100 parts by weight of titanium oxide) were added to 100 g of the methanol dispersion of titanium oxide particles (II) obtained in Reference Example 1, and then MEK was added to the resulting dispersion. The resulting dispersion of titanium oxide particles in a mixture of methanol and MEK was stirred for 5 minutes at a temperature of 22° C., thereby surface treating the dispersion with the surface treating agent.

The dispersion of titanium oxide particles thus treated was subjected to solvent displacement by the solvent displacing process 3 to provide an about 15% by weight organic solvent dispersion of titanium oxide particles, which, however, gelled soon.

Comparative Example 11

1.5 g of 3-methacryloyloxypropyltrimethoxysilane (10.0 parts by weight in relation to 100 parts by weight of titanium oxide) was added to 100 g of the methanol dispersion of titanium oxide particles (II) obtained in Reference Example 1, and then MIBK was added to the resulting dispersion. The resulting dispersion of titanium oxide particles in a mixture of methanol and MIBK was stirred for 5 minutes at a temperature of 24° C., thereby surface treating the dispersion with the surface treating agent.

The dispersion of titanium oxide particles thus treated was subjected to solvent displacement by the solvent displacing process 3, but the titanium oxide particles agglomerated to cause the dispersion to become clouded in the middle of solvent displacement. An intended MIBK dispersion was not obtained.

Comparative Example 12

1.5 g of 12-hydroxystearic acid (10.0 parts by weight in relation to 100 parts by weight of titanium oxide) was added to 100 g of the methanol dispersion of titanium oxide particles (II) obtained in Reference Example 1, and then MIBK was added to the resulting dispersion. The resulting dispersion of titanium oxide particles in a mixture of methanol and MIBK was stirred for 5 minutes at a temperature of 17° C., thereby surface treating the dispersion with the surface treating agent.

The dispersion of titanium oxide particles thus treated was subjected to solvent displacement by the solvent displacing process 3 to provide an about 15% by weight organic solvent dispersion of titanium oxide particles. However, the dispersion obtained gelled 7 days after it was prepared.

Comparative Example 13

100 g of the methanol dispersion of titanium oxide particles (II) obtained in Reference Example 1 was heated under an atmospheric pressure to distil methanol out of the dispersion completely. The residue was dried to provide titanium oxide powder.

The titanium oxide powder thus obtained was dry-mixed with 1.5 g of 3-methacryloyloxypropyltrimethoxysilane (10.0 parts by weight in relation to 100 parts by weight of titanium oxide) and 1.5 g of 12-hydroxystearic acid (10.0 parts by weight in relation to 100 parts by weight of titanium oxide) in a mortar. The thus obtained titanium oxide powder was added to MEK, and the resultant mixture was stirred and left standing to find that the titanium oxide particles sedimented in the mixture to fail to provide an MEK dispersion.

Comparative Example 14

1.5 g of 3-methacryloyloxypropyltrimethoxysilane (10.0 parts by weight in relation to 100 parts by weight of titanium oxide) and 1.5 g of 12-hydroxystearic acid (10.0 parts by weight in relation to 100 parts by weight of titanium oxide) were added to 100 g of the methanol dispersion of titanium oxide particles (II) obtained in Reference Example 1. The resulting dispersion was stirred for 5 minutes at a temperature of 25° C., thereby surface treating the dispersion with the surface treating agent.

The dispersion of titanium oxide particles thus treated was heated under an atmospheric pressure to distil methanol out of the dispersion completely. The residue was dried to provide titanium oxide powder.

The titanium oxide powder was added to MEK, stirred, and left standing to find that the titanium oxide particles sedimented in the mixture to fail to provide an MEK dispersion.

Comparative Example 15

1.5 g of 3-methacryloyloxypropyltrimethoxysilane (10.0 parts by weight in relation to 100 parts by weight of titanium oxide) and 1.5 g of acetic acid (10.0 parts by weight in relation to 100 parts by weight of titanium oxide) were added to 100 g of the methanol dispersion of titanium oxide particles (II) obtained in Reference Example 1. The resulting dispersion was stirred for 5 minutes at a temperature of 20° C., thereby surface treating the dispersion with the surface treating agent.

The dispersion of titanium oxide particles thus treated was subjected to solvent displacement by the solvent displacing process 1, but the titanium oxide particles agglomerated to cause the dispersion to become clouded in the middle of solvent displacement. An intended MEK dispersion was not obtained.

Comparative Example 16

12 g of 3-methacryloyloxypropyltrimethoxysilane (80.0 parts by weight in relation to 100 parts by weight of titanium oxide) and 1.5 g of 12-hydroxystearic acid (10.0 parts by weight in relation to 100 parts by weight of titanium oxide) were added to 100 g of the methanol dispersion of titanium oxide particles (II) obtained in Reference Example 1. The resulting dispersion was stirred for 5 minutes at a temperature of 24° C., thereby surface treating the dispersion with the surface treating agent.

The dispersion of titanium oxide particles thus treated was subjected to solvent displacement by the solvent displacing process 1 to provide an organic solvent dispersion, which, however, was found to have low transmittances.

Comparative Example 17

1.5 g of 3-methacryloyloxypropyltrimethoxysilane (10.0 parts by weight in relation to 100 parts by weight of titanium oxide) and 15 g of 12-hydroxystearic acid (100.0 parts by weight in relation to 100 parts by weight of titanium oxide) were added to 100 g of the methanol dispersion of titanium oxide particles (II) obtained in Reference Example 1. The resulting dispersion was stirred for 5 minutes at a temperature of 21° C., thereby surface treating the dispersion with the surface treating agent.

The dispersion of titanium oxide particles thus treated was subjected to solvent displacement by the solvent displacing process 1, but the titanium oxide particles agglomerated to cause the dispersion to become clouded in the middle of solvent displacement. An intended MEK dispersion was not obtained.

TABLE 1

| | Crystalline Form of Titanium Oxide | Displacing Organic Solvent | Solvent Displacing Process | Surface Treating Agent | | Surface Treating Temperature (° C.) | Solid Content (% by weight) | Content of Titanium Oxide Particles (% by weight) | Solvent Displacement Rate (%) |
|---|---|---|---|---|---|---|---|---|---|
| | | | | Silane Coupling Agent | HSA | | | | |
| Example 1 | Rutile | MEK | 1 | (a) 10.0 | 10.0 | 26 | 17.8 | 14.8 | 90.4 |
| Example 2 | Rutile | MEK | 2 | (a) 10.0 | 10.0 | 24 | 18.6 | 15.5 | 88.8 |
| Example 3 | Rutile | MEK | 3 | (a) 10.0 | 10.0 | 25 | 18.6 | 15.5 | 81.2 |
| Example 4 | Rutile | MEK | 4 | (a) 10.0 | 10.0 | 24 | 19.6 | 16.3 | 87.2 |
| Example 5 | Rutile | MEK | 2 | (a) 10.0 | 10.0 | 65 | 20.0 | 16.7 | 87.7 |
| Example 6 | Rutile | MEK | 3 | (a) 5.0 | 5.0 | 26 | 17.2 | 15.6 | 86.3 |
| Example 7 | Rutile | MEK | 3 | (a) 19.0 | 1.0 | 24 | 18.8 | 15.7 | 86.7 |
| Example 8 | Rutile | MEK | 3 | (a) 17.5 | 2.5 | 26 | 18.4 | 15.3 | 85.2 |
| Example 9 | Rutile | MEK | 3 | (a) 15.0 | 5.0 | 26 | 19.0 | 15.8 | 86.8 |
| Example 10 | Rutile | MEK | 3 | (a) 5.0 | 15.0 | 38 | 18.7 | 15.6 | 87.7 |
| Example 11 | Rutile | MEK | 3 | (a) 2.5 | 17.5 | 25 | 18.9 | 15.8 | 83.3 |
| Example 12 | Rutile | MEK | 3 | (a) 1.0 | 19.0 | 20 | 19.2 | 16.0 | 87.9 |
| Example 13 | Rutile | MEK | 3 | (a) 40.0 | 10.0 | 25 | 22.0 | 14.7 | 82.9 |
| Example 14 | Rutile | MEK | 3 | (a) 10.0 | 40.0 | 25 | 22.9 | 15.2 | 84.6 |
| Example 15 | Rutile | MEK | 2 | (a) 10.0 | 80.0 | 24 | 28.4 | 14.1 | 85.9 |
| Example 16 | Rutile | MEK | 3 | (a) 10.0 | 10.0 | 26 | 19.7 | 16.4 | 82.5 |
| Example 17 | Rutile | MEK | 3 | (a) 10.0 | 10.0 | 26 | 18.6 | 15.5 | 84.2 |
| Example 18 | Rutile | MEK | 3 | (a) 10.0 | 10.0 | 25 | 18.6 | 15.5 | 83.6 |
| Example 19 | Rutile | MEK | 3 | (a) 10.0 | 10.0 | 26 | 18.3 | 15.2 | 87.8 |
| Example 20 | Rutile | MEK | 3 | (a) 10.0 | 10.0 | 30 | 18.5 | 15.4 | 84.3 |

TABLE 2

| | Crystalline Form of Titanium Oxide | Displacing Organic Solvent | Solvent Displacing Process | Surface Treating Agent | | Surface Treating Temperature (° C.) | Solid Content (% by weight) | Content of Titanium Oxide Particles (% by weight) | Solvent Displacement Rate (%) |
|---|---|---|---|---|---|---|---|---|---|
| | | | | Silane Coupling Agent | HSA | | | | |
| Example 21 | Rutile | MEK | 3 | (g) 10.0 | 10.0 | 26 | 19.3 | 16.1 | 84.4 |
| Example 22 | Rutile | MEK | 3 | (h) 10.0 | 10.0 | 42 | 18.6 | 15.5 | 83.3 |
| Example 23 | Rutile | MEK | 3 | (i) 10.0 | 10.0 | 26 | 18.5 | 15.4 | 83.4 |
| Example 24 | Rutile | MEK | 3 | (j) 10.0 | 10.0 | 25 | 18.2 | 15.2 | 82.9 |
| Example 25 | Rutile | MIBK | 1 | (a) 10.0 | 10.0 | 30 | 17.9 | 14.9 | 89.1 |
| Example 26 | Rutile | MIBK | 3 | (a) 10.0 | 10.0 | 21 | 18.6 | 15.6 | 90.1 |
| Example 27 | Rutile | IPA | 3 | (a) 10.0 | 10.0 | 45 | 18.4 | 15.3 | 86.1 |
| Example 28 | Rutile | n-Butanol | 3 | (a) 10.0 | 10.0 | 23 | 18.5 | 15.5 | 91.3 |
| Example 29 | Rutile | PGME | 1 | (a) 10.0 | 10.0 | 32 | 18.3 | 15.2 | 89.8 |
| Example 30 | Rutile | PGME | 3 | (a) 10.0 | 10.0 | 24 | 18.5 | 15.4 | 89.1 |
| Example 31 | Rutile | Toluene | 3 | (a) 10.0 | 10.0 | 33 | 18.2 | 15.2 | 74.1 |
| Example 32 | Rutile | DMAC | 3 | (a) 10.0 | 10.0 | 20 | 18.5 | 15.4 | 89.6 |
| Example 33 | Rutile | Butyl Acetate | 3 | (a) 10.0 | 10.0 | 43 | 18.6 | 15.5 | 80.1 |
| Example 34 | Rutile | DMIB | 3 | (a) 10.0 | 10.0 | 25 | 18.7 | 15.6 | 92.3 |
| Example 35 | Rutile | DMSO | 3 | (a) 10.0 | 10.0 | 27 | 19.7 | 16.4 | 87.9 |
| Example 36 | Rutile | (1) | 3 | (a) 10.0 | 10.0 | 24 | 19.2 | 16.0 | 88.6 |
| Example 37 | Rutile | (2) | 3 | (a) 15.0 | 15.0 | 23 | 18.6 | 15.5 | 91.2 |
| Example 38 | Anatase | MEK | 3 | (a) 10.0 | 10.0 | 36 | 19.7 | 16.4 | 87.9 |
| Example 39 | Anatase | DMAC | 3 | (a) 10.0 | 10.0 | 43 | 19.4 | 16.2 | 87.7 |

Notes)
(1) γ-Butyrolactone;
(2) Diacetone Alcohol

TABLE 3

| | Turbidimetric Transmittance (%) | Transmittance at | | | | Particle Size Distribution by Dynamic Light Scattering Method | | | Viscosity (25° C.) | |
|---|---|---|---|---|---|---|---|---|---|---|
| | | 500 nm (%) | 550 nm (%) | 600 nm (%) | 800 nm (%) | D50 (nm) | D90 (nm) | Dmax (nm) | Immediately after Production (mPa·s) | Seven Days After Production (mPa·s) |
| Example 1 | 67.2 | 51.7 | 55.4 | 67.8 | 87.0 | 4.9 | 9.4 | 85.9 | 1.0 | 1.1 |
| Example 2 | 65.8 | 48.1 | 53.8 | 66.2 | 86.6 | 14.2 | 25.3 | 60.8 | 0.4 | 0.7 |
| Example 3 | 71.3 | 61.1 | 65.3 | 72.4 | 88.2 | 6.5 | 12.1 | 43.0 | 0.7 | 1.0 |
| Example 4 | 63.6 | 41.1 | 51.1 | 63.5 | 85.8 | 5.4 | 10.4 | 43.0 | 0.4 | 0.6 |
| Example 5 | 64.7 | 44.6 | 52.4 | 64.9 | 86.2 | 6.2 | 12.0 | 51.1 | 0.6 | 0.7 |
| Example 6 | 56.2 | 9.9 | 11.1 | 30.5 | 82.4 | 14.4 | 30.2 | 80.9 | 1.9 | 9.7 |
| Example 7 | 53.1 | 3.5 | 6.0 | 17.6 | 80.4 | 13.9 | 36.5 | 77.9 | 0.8 | 0.8 |
| Example 8 | 56.6 | 5.3 | 14.1 | 33.1 | 83.4 | 6.2 | 12.2 | 36.1 | 0.5 | 0.6 |
| Example 9 | 57.3 | 5.1 | 13.7 | 36.8 | 84.6 | 11.3 | 26.2 | 74.4 | 1.1 | 1.2 |
| Example 10 | 59.4 | 25.6 | 46.2 | 58.3 | 87.1 | 10.4 | 20.0 | 72.4 | 1.5 | 1.8 |
| Example 11 | 66.4 | 39.8 | 55.5 | 66.8 | 89.2 | 3.7 | 6.6 | 30.4 | 0.6 | 0.7 |
| Example 12 | 60.8 | 31.2 | 47.8 | 60.0 | 84.7 | 10.6 | 24.7 | 51.1 | 1.9 | 2.1 |
| Example 13 | 55.2 | 4.3 | 9.1 | 25.5 | 88.0 | 15.6 | 23.7 | 60.8 | 0.7 | 0.5 |
| Example 14 | 56.5 | 11.6 | 17.8 | 32.2 | 89.2 | 10.8 | 18.4 | 43.0 | 0.8 | 0.6 |
| Example 15 | 59.5 | 25.9 | 46.3 | 58.4 | 91.9 | 8.4 | 14.0 | 43.0 | 1.1 | 1.1 |
| Example 16 | 64.6 | 33.9 | 50.8 | 63.9 | 89.8 | 8.2 | 15.7 | 52.2 | 1.2 | 1.5 |
| Example 17 | 65.1 | 33.6 | 49.8 | 62.0 | 87.1 | 10.9 | 18.7 | 51.1 | 0.7 | 0.8 |
| Example 18 | 63.0 | 29.3 | 45.9 | 59.1 | 86.9 | 7.7 | 14.2 | 43.0 | 0.6 | 0.7 |
| Example 19 | 54.5 | 4.0 | 8.0 | 22.7 | 81.3 | 11.9 | 25.3 | 68.9 | 2.5 | 35.0 |
| Example 20 | 60.8 | 32.7 | 49.8 | 62.9 | 89.2 | 6.2 | 12.5 | 43.0 | 0.6 | 0.7 |

TABLE 4

| | Turbidimetric Transmittance (%) | Transmittance at | | | | Particle Size Distribution by Dynamic Light Scattering Method | | | Viscosity (25° C.) | |
|---|---|---|---|---|---|---|---|---|---|---|
| | | 500 nm (%) | 550 nm (%) | 600 nm (%) | 800 nm (%) | D50 (nm) | D90 (nm) | Dmax (nm) | Immediately after Production (mPa·s) | Seven Days After Production (mPa·s) |
| Example 21 | 56.5 | 4.7 | 11.7 | 32.0 | 82.5 | 12.8 | 28.9 | 71.9 | 1.0 | 1.5 |
| Example 22 | 54.1 | 3.8 | 7.3 | 21.0 | 81.1 | 8.9 | 16.1 | 51.1 | 0.6 | 0.5 |

TABLE 4-continued

|  | Turbidimetric Transmittance (%) | Transmittance at | | | | Particle Size Distribution by Dynamic Light Scattering Method | | | Viscosity (25° C.) | |
|---|---|---|---|---|---|---|---|---|---|---|
|  |  | 500 nm (%) | 550 nm (%) | 600 nm (%) | 800 nm (%) | D50 (nm) | D90 (nm) | Dmax (nm) | Immediately after Production (mPa·s) | Seven Days After Production (mPa·s) |
| Example 23 | 51.7 | 19.4 | 35.5 | 50.0 | 83.2 | 7.8 | 28.7 | 84.4 | 1.9 | 5.9 |
| Example 24 | 63.5 | 36.3 | 52.4 | 64.6 | 88.8 | 15.0 | 34.0 | 54.5 | 0.7 | 1.0 |
| Example 25 | 77.0 | 61.3 | 66.9 | 78.0 | 89.6 | 5.8 | 9.6 | 36.1 | 1.4 | 1.6 |
| Example 26 | 77.1 | 61.4 | 67.0 | 78.1 | 89.6 | 7.3 | 20.5 | 32.5 | 1.3 | 1.5 |
| Example 27 | 51.1 | 4.9 | 9.7 | 12.2 | 79.0 | 24.8 | 38.0 | 74.9 | 2.7 | 3.1 |
| Example 28 | 65.0 | 45.6 | 52.8 | 65.2 | 86.3 | 18.3 | 35.7 | 71.5 | 4.7 | 5.3 |
| Example 29 | 69.1 | 46.2 | 57.6 | 70.0 | 87.6 | 5.1 | 9.3 | 43.0 | 5.5 | 5.7 |
| Example 30 | 59.5 | 25.8 | 46.3 | 58.3 | 84.1 | 8.5 | 15.5 | 43.0 | 4.1 | 3.9 |
| Example 31 | 63.5 | 41.0 | 51.1 | 63.5 | 85.8 | 15.7 | 21.8 | 43.0 | 0.9 | 1.3 |
| Example 32 | 73.7 | 55.6 | 63.0 | 74.8 | 88.8 | 4.3 | 7.8 | 25.5 | 2.0 | 2.3 |
| Example 33 | 50.0 | 3.6 | 5.2 | 9.9 | 78.1 | 7.9 | 12.3 | 30.4 | 1.2 | 1.4 |
| Example 34 | 72.1 | 52.7 | 61.2 | 73.3 | 88.4 | 17.0 | 32.1 | 51.1 | 5.7 | 6.3 |
| Example 35 | 58.2 | 19.8 | 44.7 | 56.6 | 83.4 | 3.6 | 6.6 | 36.1 | 9.1 | 9.3 |
| Example 36 | 54.9 | 4.1 | 8.7 | 24.5 | 81.6 | 3.9 | 7.3 | 43.0 | 9.0 | 9.2 |
| Example 37 | 68.4 | 43.5 | 57.6 | 68.5 | 87.4 | 13.4 | 27.1 | 72.3 | 7.7 | 8.5 |
| Example 38 | 64.5 | 44.2 | 52.2 | 64.7 | 86.1 | 18.8 | 31.9 | 61.3 | 1.9 | 2.1 |
| Example 39 | 84.7 | 65.1 | 76.1 | 84.5 | 92.0 | 6.9 | 12.6 | 36.1 | 4.0 | 4.3 |

TABLE 5

|  | Displacing Organic Solvent | Solvent Diplacing Process | Surface Treating Agent | | | | Surface Treating Temperature (° C.) | Solid Content (% by weight) | Content of Titanium Oxide Particles (% by weight) | Solvent Displacement Rate (%) |
|---|---|---|---|---|---|---|---|---|---|---|
|  |  |  | Silance Coupling Agent | HAS | Stearic Acid | Acetic Acid |  |  |  |  |
| Comparative 1 | MEK | 3 | — | — | — | — | 23 | Titanium oxide particles sedimented and dispersioon clouded in the middle of solvent displacement | | |
| Comparative 2 | MEK | 3 | (a) 10.0 | — | — | — | 24 | Titanium oxide particles sedimented and dispersioon clouded in the middle of solvent displacement | | |
| Comparative 3 | MEK | 3 | — | 10.0 | — | — | 25 | Gelled in the middle of solvent displacement | | |
| Comparative 4 | MEK | 3 | (a) 20.0 | — | — | — | 26 | Titanium oxide particles sedimented and dispersioon clouded in the middle of solvent displacement | | |
| Comparative 5 | MEK | 3 | — | 20.0 | — | — | 24 | Gelled in the middle of solvent displacement | | |
| Comparative 6 | MEK | 3 | (a) 0.5 | 0.5 | — | — | 20 | Gelled in the middle of solvent displacement | | |
| Comparative 7 | MEK | 3 | (k) 10.0 | 10.0 | — | — | 25 | Gelled in the middle of solvent displacement | | |
| Comparative 8 | MEK | 3 | (l) 10.0 | 10.0 | — | — | 25 | Gelled soon after solvent displacement | | |
| Comparative 9 | MEK | 3 | (m) 10.0 | 10.0 | — | — | 25 | Gelled soon after solvent displacement | | |
| Comparative 10 | MEK | 3 | (a) 10.0 | — | 10.0 | — | 22 | Gelled soon after solvent displacement | | |
| Comparative 11 | MIBK | 3 | (a) 10.0 | — | — | — | 24 | Titanium oxide particles sedimented and dispersioon clouded in the middle of solvent displacement | | |
| Comparative 12 | MIBK | 3 | — | 10.0 | — | — | 17 | 17.5 | 15.9 | 89.4 |
| Comparative 13 | MEK | — | (a) 10.0 | 10.0 | — | — | — | Titanium oxide particles sedimented | | |
| Comparative 14 | MEK | — | (a) 10.0 | 10.0 | — | — | 25 | Titanium oxide particles sedimented | | |
| Comparative 15 | MEK | 1 | (a) 10.0 | — | — | 10.0 | 20 | Titanium oxide particles sedimented and dispersioon clouded in the middle of solvent displacement | | |
| Comparative 16 | MEK | 1 | (a) 80.0 | 10.0 | — | — | 24 | 27.4 | 14.4 | 89.6 |
| Comparative 17 | MEK | 1 | (a) 10.0 | 100.0 | — | — | 21 | Titanium oxide particles sedimented and dispersioon clouded in the middle of solvent displacement | | |

TABLE 6

|  | Turbidimetric Transmittance (%) | Transmittance at | | | | Particle Size Distribution by Dynamic Light Scattering Method | | | Viscosity (25° C.) | |
|---|---|---|---|---|---|---|---|---|---|---|
|  |  | 500 nm (%) | 550 nm (%) | 600 nm (%) | 800 nm (%) | D50 (nm) | D90 (nm) | Dmax (nm) | Immediately after Production (mPa·s) | Seven Days After Production (mPa·s) |
| Comparative 1 | — | — | — | — | — | — | — | — | — | — |
| Comparative 2 | — | — | — | — | — | — | — | — | — | — |
| Comparative 3 | — | — | — | — | — | — | — | — | — | — |
| Comparative 4 | — | — | — | — | — | — | — | — | — | — |
| Comparative 5 | — | — | — | — | — | — | — | — | — | — |
| Comparative 6 | — | — | — | — | — | — | — | — | — | — |
| Comparative 7 | — | — | — | — | — | — | — | — | — | — |
| Comparative 8 | — | — | — | — | — | — | — | — | — | — |
| Comparative 9 | — | — | — | — | — | — | — | — | — | — |
| Comparative 10 | — | — | — | — | — | — | — | — | — | — |
| Comparative 11 | — | — | — | — | — | — | — | — | — | — |
| Comparative 12 | 55.6 | 4.4 | 10.0 | 27.8 | 82.0 | — | — | — | 65.0 | Gelled |
| Comparative 13 | — | — | — | — | — | — | — | — | — | — |
| Comparative 14 | — | — | — | — | — | — | — | — | — | — |
| Comparative 15 | — | — | — | — | — | — | — | — | — | — |
| Comparative 16 | 24.8 | 0.0 | 0.0 | 0.8 | 43.3 | 18.7 | 30.5 | 288.9 | 0.7 | 0.7 |
| Comparative 17 | — | — | — | — | — | — | — | — | — | — |

The invention claimed is:

1. An organic solvent dispersion of titanium oxide particles in a content of 10% by weight or more in an organic solvent except methanol and ethanol,
wherein the titanium oxide particles are surface-treated with a surface treating agent comprising a silane coupling agent having the general formula (I)

$$(RO)_n\text{—Si—}X_{4-n} \qquad (I)$$

wherein R is an alkyl group having carbon atoms of 1-4, n is 2 or 3, X is an alkyl, a fluoroalkyl, a vinyl or a (meth)acryloyloxyalkyl group, and 12-hydroxystearic acid, and
wherein the titanium oxide particles in the organic solvent have a D50 in a range of 1 to 30 nm, and
wherein the organic solvent dispersion has a transmittance of 2% or more at a wavelength of 500 nm and a transmittance of 70% or more at a wavelength of 800 nm, a viscosity of 10 mPa·s or less at a temperature of 25° C. immediately after production while an increase in the viscosity is 40 mPa·s or less seven days after production as compared to that of the dispersion immediately after production.

2. The organic solvent dispersion of titanium oxide in an organic solvent according to claim 1, in which the titanium oxide particles are surface-treated with 1-40 parts by weight of the silane coupling agent and 1-80 parts by weight of 12-hydroxystearic acid each in relation to 100 parts by weight of the titanium oxide particles.

3. The organic solvent dispersion of titanium oxide in an organic solvent according to claim 1, in which the organic solvent is at least one selected from methyl isobutyl ketone, methyl ethyl ketone, diacetone alcohol, butanol, propanol, propylene glycol monomethyl ether, toluene, dimethylsulfoxide, N,N-dimethylacetamide, N,N,2-trimethylpropionamide, γ-butyrolactone, and butyl acetate.

4. The organic solvent dispersion of titanium oxide in an organic solvent according to claim 2, in which the organic solvent is at least one selected from methyl isobutyl ketone, methyl ethyl ketone, diacetone alcohol, butanol, propanol, propylene glycol monomethyl ether, toluene, dimethylsulfoxide, N,N-dimethylacetamide, N,N,2-trimethylpropionamide, γ-butyrolactone, and butyl acetate.

\* \* \* \* \*